Feb. 23, 1954     D. B. ROSSHEIM ET AL     2,669,835
WALL STRUCTURE FOR REGENERATIVELY COOLED ROCKET MOTORS
Filed March 4, 1949
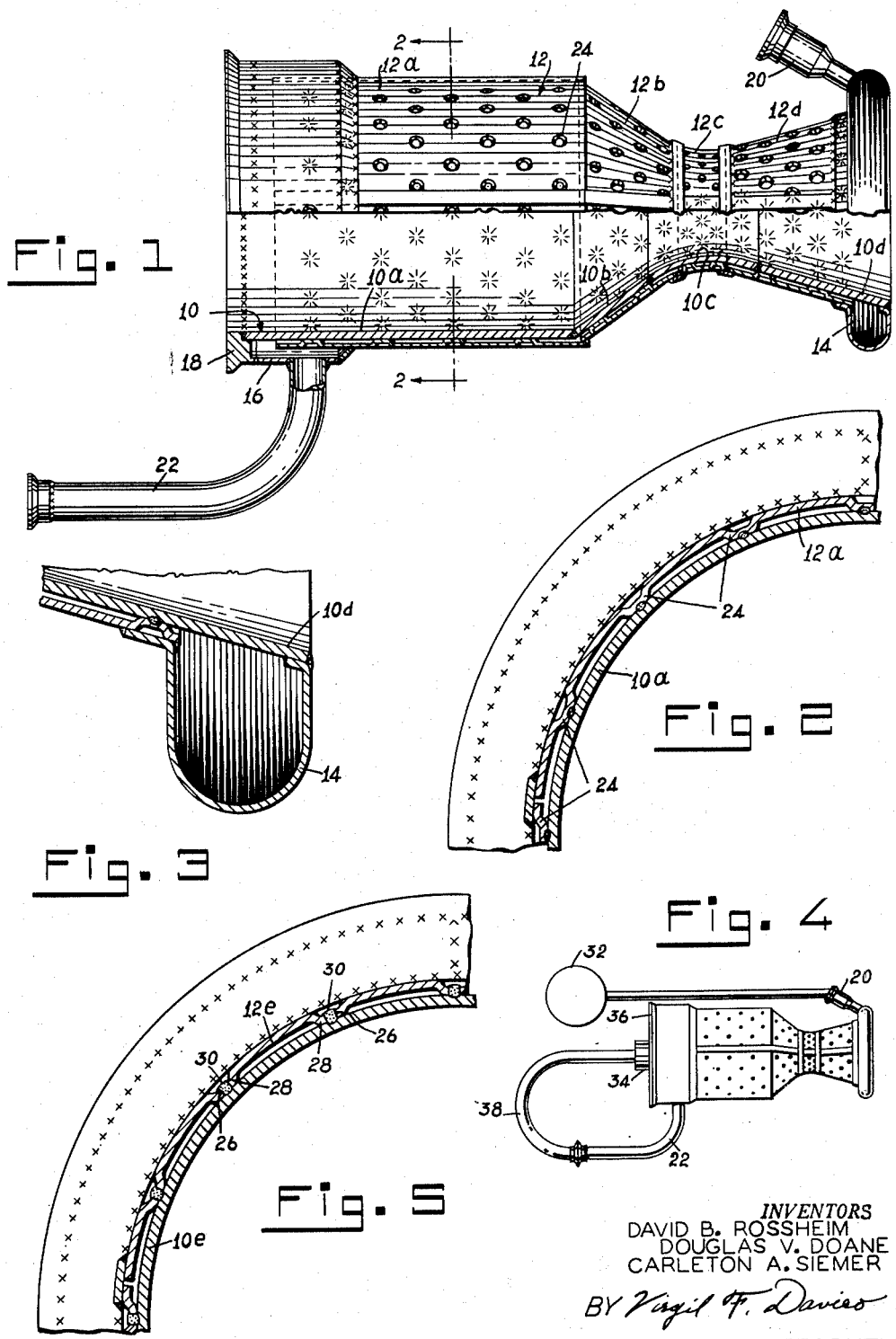
INVENTORS
DAVID B. ROSSHEIM
DOUGLAS V. DOANE
CARLETON A. SIEMER
BY *Virgil F. Davies*
ATTORNEY Patented Feb. 23, 1954

2,669,835

UNITED STATES PATENT OFFICE 2,669,835

WALL STRUCTURE FOR REGENERATIVELY COOLED ROCKET MOTORS

David B. Rossheim, Teaneck, and Douglas V. Doane, Maywood, N. J., and Carleton A. Siemer, Staten Island, N. Y., assignors to The M. W. Kellogg Company, Jersey City, N. J., a corporation of Delaware Application March 4, 1949, Serial No. 79,562

7 Claims. (Cl. 60—35.6)

The present invention relates to thrust cylinders for rocket motors and more particularly to a regeneratively cooled rocket motor thrust cylinder capable of operating continuously over extended periods of time.

Heretofore, attempts to operate large rocket motors using a liquid propellant continuously over extended periods of time have been unsuccessful, due primarily to the fact that it has not been possible to maintain the temperature of the rocket motor thrust cylinder and its associated thrust nozzle below their melting points. As a result it has been necessary to shut such rocket motors down after a short burst, to prevent the thrust cylinder and nozzle from being eroded or burned up. Attempts have been made to cool the thrust cylinder, but heretofore these attempts have been unsuccessful. Attempts to utilize a separate coolant add to the rocket motor the weight and bulk of the coolant, the means provided for its storage, and the associated valves, piping and pumps necessary to circulate it. All of this is obviously undesirable, and especially so in rocket motors intended for airborne application. In addition to the above disadvantages the use of a separate coolant reduces the efficiency of the rocket motor by reason of the heat lost to the coolant.

Attempts, prior to the present invention, at regenerative cooling of rocket motors employing fluid propellants, wherein the fluid propellant is employed as a coolant, have also been unsuccessful due to the problem presented by the great amount of heat that must be dissipated and the relatively small amount of coolant that is available to dissipate it.

It is one object of the present invention to provide a rocket thrust cylinder capable of operating continuously over extended periods of time.

It is another object of the present invention to provide a regeneratively cooled rocket thrust cylinder capable of operating continuously over extended periods of time.

It is another object of the present invention to provide a light weight regeneratively cooled rocket thrust cylinder capable of operating continuously over extended periods of time.

It is another object of the present invention to provide a light weight regeneratively cooled rocket thrust cylinder capable of operating continuously over extended periods of time and having sufficient strength to resist collapsing due to the pressure of the coolant fluid.

Other objects of the invention will in part be obvious and will in part appear hereinafter.

The invention accordingly comprises an apparatus possessing the construction, combination of elements and arrangements of parts which are exemplified in the following detailed disclosure and the scope of the application of which will be indicated in the claims.

For a fuller understanding of the nature and objects of the invention, reference should be had to the following detailed description taken in connection with the accompanying drawing wherein;

Fig. 1 is a somewhat diagrammatic plan view, partly in section, of a rocket motor thrust cylinder embodying the present invention;

Fig. 2 is an enlarged fragmentary sectional view taken along the line 2—2 of Fig. 1;

Fig. 3 is an enlarged fragmentary sectional view of the coolant inlet manifold of the thrust cylinder of Fig. 1;

Fig. 4 is a diagrammatic view of a rocket motor incorporating the present invention; and Fig. 5 is a view similar to Fig. 2 but showing a modification thereof.

The present invention comprises a rocket motor thrust cylinder having an inner shell and an outer shell concentric therewith and spaced therefrom a predetermined distance to give an annular coolant passage around the inner shell, and extending substantially along its entire length, having a cross sectional area such that the rate of flow of the coolant, which is one of the propellants, will give a film coefficient of heat transfer such that the limited flow of coolant available will maintain the inner shell below a predetermined temperature. A further feature of the present invention is the manner in which the inner shell and outer shell are attached to one another to space said shells a predetermined distance apart and maintain the concentricity of the shells under all operating conditions, and to reinforce the inner shell against collapsing under the pressure of the coolant at the high temperature the inner shell attains in continuous operation, and at the same time not seriously interfere with the transfer of heat from the inner shell to the coolant, or with the flow of said coolant through said passage.

As stated above the amount of propellant that is used is extremely small in proportion to the amount of heat that is generated. Prior art regeneratively cooled thrust cylinders have failed because the limited amount of propellant available was not employed effectively, and as employed was not sufficient to cool the thrust cylinder and maintain its temperature low enough to prevent its destruction. Another cause of failure in prior art regeneratively cooled thrust cylinders has been the relatively thick wall of the thrust cylinder which had heretofore been necessary to withstand the high pressure of the propellant-coolant needed to properly inject the propellant into the thrust cylinder. Heretofore, when the thrust cylinder wall had sufficient strength to withstand the pressure of the propellant-coolant, it was too thick to permit heat transfer through said wall at a rate high enough to prevent its destruction by burning. When the prior art thrust cylinders were made with a wall thin enough to permit effective heat transfer therethrough, they failed in operation by collapsing under the pressure of the propellant-coolant.

The present invention overcomes all of the above objectionable features of the prior art thrust cylinders and provides a light weight regeneratively cooled thrust cylinder having relatively thin walls that are so constructed and arranged that they are capable of withstanding the high operating pressure of the propellant-coolant when they attain their operating temperature to permit the effective transfer of heat through the inner shell thereof. The annular passage for the propellant-coolant is so constructed and arranged that said coolant is forced to travel through said passage at a high velocity and thus has a high film coefficient of heat transfer. Such a structure makes possible a high rate of heat transfer through the thrust cylinder wall to the coolant whereby a relatively small volume of coolant is capable of effectively maintaining the temperature of the thrust cylinder at a safe level and the thrust cylinder can be operated continuously over extended periods of time.

Referring now to Fig. 1 of the drawing, there is disclosed a preferred embodiment of the present invention comprising a rocket motor thrust cylinder having an inner shell 10 fabricated from sections 10a, 10b, 10c, and 10d. Section 10a is substantially cylindrical in cross section, section 10b and 10d are conical and section 10c is a portion of a torus. Adjacent edges of sections 10a, 10b, 10c, and 10d are substantially the same diameter and are welded together. In the completed inner shell 10, section 10a defines a combustion portion and sections 10b, 10c and 10d form a Venturi type thrust nozzle. Sections 10a, 10b, 10c and 10d are disclosed as being formed from plate or sheet material cut to the desired dimensions, bent to shape, and then welded together. Obviously, inner shell 10 can be formed from a single sheet of material, from a greater or lesser number of sections, or can be constructed in any other desired manner. Section 10c is preferably formed from thinner material than the other three sections for reasons that will be explained more fully hereinafter.

Inner shell 10 is enclosed in and concentrically spaced a predetermined radial distance from an outer shell 12 made up of sections 12a, 12b, 12c and 12d, each of which is generally similar to sections 10a, 10b, 10c and 10d of inner shell 10 and which are also welded together. Obviously, outer shell 12 can be formed from a greater or lesser number of sections, or can be constructed in any other desired manner.

An inlet manifold ring 14 for supplying the propellant-coolant to the annular passage is provided at the outer end of the thrust nozzle, and an outlet manifold ring 16 for collecting the propellant-coolant after it has passed through said passage is provided at the combustion chamber end of the thrust cylinder. Inlet manifold 14 is attached to the thrust nozzle by having one of its sides welded to the larger diameter end of section 10d and have its other side welded to the large diameter end of section 12d. Outlet manifold 16 is attached to the thrust cylinder by having one of its sides welded to section 12a and its other side welded to one side of flanged ring 18. The other side of flanged ring 18 is welded to the end of section 10a. It will thus be seen that manifold ring 14 forms a closure for one end of an annular passage around inner shell 10 and also provides a means of ingress into said passage for the coolant-propellant, and that manifold ring 16 forms a closure for the other end of said passage and also provides a means of egress for said coolant-propellant.

Inner and outer shells 10 and 12 respectively are formed from a material capable of withstanding the corrosive action of the propellant or propellants employed and/or their products of combustion, and which is capable of being welded. To manufacture a rocket motor thrust cylinder capable of using gasoline and nitric acid as components of a bipropellant combination it is preferred to use a material known as A. I. S. I. Type 347 stainless steel. This is a material comprising the following analysis:

Carbon_____ .10% maximum
Manganese_____ 2.00% maximum
Silicon_____ 1.00% maximum
Phosphorus_____ .040% maximum
Sulphur_____ .030% maximum
Chromium_____ 17.00% to 19.00%
Nickel_____ 9.00% to 12.00%
Columbium_____ 8 to 10 times the carbon minimum but not to exceed 1.0%

However, it will be appreciated by those skilled in the art that other materials may be used which are capable of being welded and which have the necessary high temperature strength and resistance to corrosion.

Pipes 20 and 22 are connected to inlet manifold 14 and outlet manifold 16 respectively and serve to supply inlet manifold 14 with propellant-coolant from tank 32 and to draw said propellant-coolant from outlet manifold 16. Pipe 22 is adapted to be connected to injector 34 carried by an end plate 36 by means of a pipe 38. End plate 36 can be attached to the thrust cylinder by being clamped to flanged ring 18. Injector 34 may be of any convenient design.

The annular space between inner shell 10 and outer shell 12 is extremely small relative to the diameter of the thrust cylinder and the volume of coolant that must pass therethrough, and should be maintained to close tolerances if the highest possible coolant efficiency is to be obtained. Also, inasmuch as both inner shell 10 and outer shell 12 are made up of relatively thin material, it is necessary that inner shell 10, which is subjected to the extremely high temperature in operation, and even when efficiently and adequately cooled suffers a considerable reduction in its modulus of elasticity, be reinforced to prevent it from collapsing under the pressure of the coolant in the annular passage. To both space inner and outer shells 10 and 12 a predetermined distance from each other and to reinforce inner shell 10, a plurality of protuberances 24 are pressed inwardly from outer shell 12 a distance sufficient to give them a height equal to the predetermined space desired between shells 10 and 12. Each protuberance is fastened to inner shell 10, preferably by spot welding and, inasmuch as it is desirable that there be a good thermal bond between each protuberance and inner shell 10, each spot weld covers about 80% of the area of the face of the protuberance. It will thus be seen that protuberances 24, when spaced circumferentially and longitudinally along outer shell 12, will space inner shell 10 a predetermined desired distance from said outer shell 12. Preferably, protuberances 24 are formed in shell 12 in a plurality of circumferential rings, each ring having its protuberances in adjacent circumferential rings. It is essential that sufficient protuberances 24 be provided and that they be spaced close enough together so that they will reinforce inner shell 10 when the thrust cylinder is in operation to prevent any collapse thereof. It is also equally important that no more protuberances be provided than are necessary to reinforce inner shell 10, inasmuch as too many protuberances cut down the cross sectional area of the annular passage which is available for the coolant to flow through, thus making it increasingly difficult for the limited supply of coolant to successfully cool inner shell 10. The size of the protuberances is selected to provide a maximum amount of reinforcement and at the same time not unduly restrict the flow of coolant in the annular passage. The protuberances also serve as turbulence producing means in said annular passage and thus improve the heat transfer from inner shell 10 to the propellant coolant.

The portion of the thrust cylinder which is subjected to the highest temperature is the most restricted portion of the thrust nozzle, i. e. torus section 10c. To permit the greater amount of heat which must be dissipated through torus section 10c to pass therethrough and be transferred to the propellant-coolant in the annular passage, it is preferred to make torus section 10c thinner than the other sections comprising inner shell 10. Inasmuch as torus section 10c is made of thinner material, its resistance to collapse from the fluid pressure of the propellant-coolant is lower than the resistance of the other three sections and it is, therefore, necessary to provide torus section 12c of outer shell 12 with more closely spaced protuberances. However, to avoid the loss of too much cross sectional area in the annular passage at this point, the protuberances formed in section 12c are of smaller diameter than the protuberances formed in the other sections of outer shell 12. Obviously the entire inner shell 10 can be made the same thickness as torus section 10c. However, when this is done it will be necessary to increase the number of protuberances in sections 12a, 12b and 12c to provide the increased reinforcement required.

A specific example of a rocket motor thrust cylinder incorporating the principles of the present invention, which has successfully operated continuously over extended periods of time, and which is adapted to use gasoline and nitric acid as components of a bipropellant combination, follows:

Section 10a is a cylinder having a diameter of about 8½ inches and a length of about 12 inches. Section 10b is a conical member about 3½ inches long and having about a 30° taper. Section 10d is a conical member about 4½ inches long and having about a 15° taper and having a diameter at its large end of about 6½ inches. Torus section 10c has a length of about 1¾ inches and has a diameter at each end similar to the smaller diameters of conical sections 10b and 10d. Sections 10a, 10b and 10d preferably have a thickness of about .141 inch. Torus section 10c preferably has a thickness of about .078 inch. All four sections, 10a, 10b, 10c and 10d are fabricated by rolling a sheet of material to the desired size and shape and welding the abutting edges together. Outer shell 12 has dimensions generally similar to those for inner shell 10 but is sufficiently larger to permit the desired cross sectional area in the annular passage between the two shells, and each section thereof is preferably made in two halves to facilitate its assembly over inner shell 10. The two halves of the sections comprising outer shell 12, and the sections themselves, are preferably welded together by means of strap welds. The outer shell 12 of a thrust cylinder for a rocket motor of the size of the example being given is sufficiently larger in diameter than inner shell 10 to give an annular passage having a radial spacing in the order of .03 inch to .04 inch.

The radial spacing of shells 10 and 12 of about .03 inch to .04 inch provides a thin layer of coolant over over inner shell 10 that, while not a film, is a close approximation of a film as far as heat transfer characteristics of the coolant are concerned, and also is a spacing that is possible to attain in a practical way within the limits of normal machine tools. Such a spacing also permits the propellant-coolant to flow therethrough without too great a pressure drop between inlet manifold 14 and outlet manifold 16.

The annular rings of protuberances 24 are spaced along cylindrical section 12a about 1¼ inches apart. The protuberances on conical sections 12b and 12d are spaced progressively closer together, extending from the larger diameter ends to the smaller diameter ends of said conical sections, from about 1¼ inches apart extending down to a spacing of about ¾ of an inch. The longitudinal spacing of the rings of protuberances on torus section 12c is about ¾ of an inch. The number of protuberances 24 that make up each ring of protuberances along outer shell 12 is the same in each ring regardless of the section upon which it appears, and preferably 20 protuberances are formed in each ring. The protuberances formed in sections 12a, 12b and 12d are all substantially .20 inch in diameter. The protuberances formed in torus section 12c all have a diameter of approximately .10 inch. All of the protuberances, regardless of the section on which they appear, extend from the inner surface of outer shell 12a a distance in the order of .03 inch to .04 inch. Each of the protuberances is welded to the adjacent portion of inner shell 10 to securely fasten the two shells together.

Thrust cylinders, incorporating the principles of the present invention, having higher or lower thrust characteristics, may be made by proportionally increasing or decreasing the dimensions of the above described components.

Figure 5 illustrates a modified form of the present invention wherein a plurality of holes 26 are formed in outer shell 12e, and the edges of these holes are shaped to give a rim or flange 28 around the holes. Flange 28 extends inwardly from the inner surface of outer shell 12e a distance substantially equal to the distance protuberances 24 extend inwardly from outer shell 12. Outer shell 12e is attached to inner shell 10e by filling holes 26 with weld material 30.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. A regeneratively cooled rocket motor thrust cylinder comprising a relatively thin sheet material inner shell defining a combustion portion and a thrust nozzle, a relatively thin sheet material outer shell substantially enclosing and concentrically spaced around said inner shell defining an annular passage for a coolant between said shells, means for controlling the supply of a coolant connecting said shells at their ends, and a plurality of spacing protuberances pressed from one of said shells and extending across said annular passage and joining the other of said shells for maintaining a uniform cross-sectional area for said annular passage.

2. A regeneratively cooled rocket motor thrust cylinder comprising an inner shell defining a combustion portion and a thrust nozzle, an outer shell substantially enclosing and concentrically spaced around said inner shell to provide an annular passage for a coolant between said shells, said shells being of relatively thin sheet material, tubular and substantially unitary, said passage extending over said thrust nozzle and said combustion portion, said outer shell being spaced substantially the same distance from said inner shell throughout its length and joined thereto, a plurality of spacing and reinforcing protuberances pressed from one of said shells and extending across said annular passage and contacting the other of said shells, for maintaining the radial spacing of said shells, and providing means for joining them together, and inlet and outlet means for said passage connecting said shells at their adjacent ends.

3. A regeneratively cooled rocket motor thrust cylinder comprising an inner tubular shell defining a combustion portion and a thrust nozzle, an outer tubular shell substantially enclosing and concentrically spaced around said inner shell to provide an annular passage for a coolant between said shells, said shells being of relatively thin sheet material, and substantially tubular, said passage extending over said thrust nozzle and said combustion portion, said outer shell being spaced substantially the same distance from said inner shell throughout its length, a plurality of circumferentially and longitudinally spaced reinforcing and spacing protuberances pressed from said outer shell and extending across said annular passage and contacting and fastened to said inner shell to space and reinforce said inner shell a predetermined distance from said outer shell, and means for the ingress and egress of a coolant joining said inner and outer shells at their adjacent edges.

4. A regeneratively cooled rocket motor thrust cylinder adapted to be cooled by the propellant employed to drive said motor comprising, an inner shell and an outer shell substantially enclosing and concentrically spaced around said inner shell to provide an annular passage for said propellant between said shells, said shells being of relatively thin sheet material, tubular and substantially unitary, a plurality of spacing and reinforcing protuberances pressed from one of said shells and engaging and fastened to the other of said shells, for maintaining a uniform cross-sectional area for said annular passage, the height of said protuberances being such that the space between said shells will cause said propellant passing through said passage to approximate a film passing over said inner shell at a velocity sufficiently high to permit heat to be transferred through said inner shell to said propellant at a rate sufficient to maintain said inner shell at a safe temperature, and means defining the inlet and the outlet for said passage connecting said inner and outer shells at their adjacent edges.

5. A regeneratively cooled rocket motor thrust cylinder adapted to consume a propellant at a predetermined rate and adapted to be cooled by said propellant prior to its consumption to permit said motor to be operated continuously over extended periods of time comprising, an inner shell defining a combustion portion in which said propellant is consumed and an axially aligned venturi thrust nozzle through which the hot products of combustion pass, an outer shell substantially enclosing and concentrically spaced around and reinforcing said inner shell and forming with said inner shell an annular passage between said shells for said propellant, said shells being of relatively thin sheet material, tubular and substantially unitary, a plurality of spacing and reinforcing protuberances pressed from one of said shells and engaging and fastened to the other of said shells, the heights of said protuberances being substantially equal so that said outer shell is spaced substantially the same distance from said inner shell throughout its length, said heights also being such that the space between said shells will cause said propellant passing through said passage to approximate a film passing over said inner shell at a velocity sufficiently high to permit heat to be transferred through said inner shell to said propellant at a rate sufficient to maintain said inner shell at a safe temperature, and means for conducting said propellant to and away from said passage joining the adjacent edges of said inner and outer shells.

6. A light weight combustion device adapted to operate continuously over extended periods of time and to consume, at a predetermined rate, a fluid supplied it under pressure to thereby develop a large volume of gas at a high temperature comprising, a fabricated inner tubular shell having relatively thin walls defining a combustion portion and an exhaust portion through which the products of combustion pass, a relatively thin walled fabricated tubular casing for said shell concentrically spaced therearound to provide an annular passage between said shell and said casing capable of conducting said fluid under pressure over said shell prior to its entry into said combustion portion to cool said shell, a plurality of longitudinally and radially spaced protuberances formed from said casing extending across said passage and fastened to said inner shell to maintain the uniform spacing between said casing and said inner shell, all of said protuberances being substantially equal in length, said length being such that the cross sectional area of said annular passage is so proportioned to the periphery of said inner shell and to the rate of flow of said fluid that said fluid will be forced to flow through said annular passage in an approximation of a film at a velocity which will permit heat to be transferred through said inner shell to said fluid at a rate sufficient to maintain said inner shell at a safe temperature, and means, connecting adjacent edges of said shell and casing, for providing said fluid to said passage and for discharging the same.

7. A regeneratively cooled rocket motor thrust cylinder adapted to be cooled by the propellant employed to drive said motor comprising, an inner shell and an outer shell concentrically spaced around said inner shell and substantially coextensive therewith to provide an annular passage for said propellant between said shells, said shells being of relatively thin sheet material, tubular and substantially unitary, a plurality of spacing and reinforcing protuberances pressed from one of said shells engaging and fastened to the other of said shells, the height of said protuberances being in the order of .03 inch to .04 inch to space said shells apart a distance in the order of .03 inch to .04 inch, whereby the space between said shells will cause said propellant passing therethrough to approximate a film passing over said inner shell at a velocity sufficiently high to permit heat to be transferred through said inner shell to said propellant at a rate sufficient to maintain said inner shell at a safe temperature, and means uniting adjacent edges of said shells for furnishing said propellant to said passage and conducting the same away.

DAVID B. ROSSHEIM.
DOUGLAS V. DOANE.
CARLETON A. SIEMER.

References Cited in the file of this patent

UNITED STATES PATENTS

| Number | Name | Date |
|---|---|---|
| 1,250,260 | Wilcox | Dec. 18, 1917 |
| 2,397,658 | Goddard | Apr. 2, 1946 |
| 2,445,856 | Mayer | July 27, 1948 |
| 2,446,059 | Peterson et al. | July 27, 1948 |
| 2,448,561 | Way | Sept. 7, 1948 |
| 2,448,648 | Zideck | Sept. 7, 1948 |
| 2,585,626 | Chilton | Feb. 12, 1952 |